H. R. GEER.
ROLLING MILL LUBRICATION.
APPLICATION FILED OCT. 7, 1920.
1,397,163.
Patented Nov. 15, 1921.
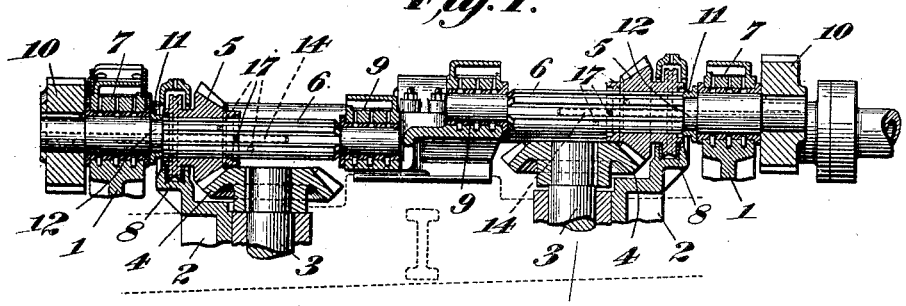
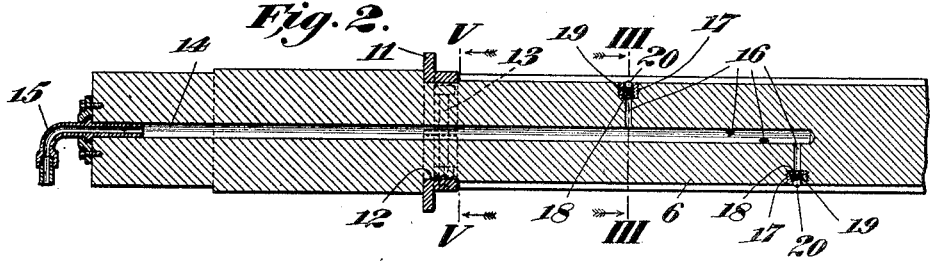
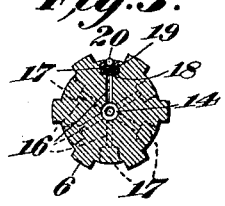
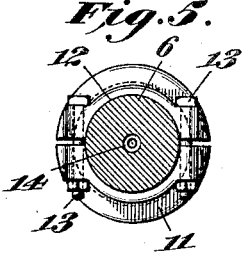
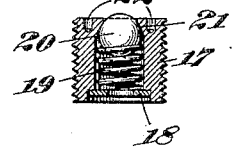
INVENTOR
*Harry R. Geer.*
BY
*Geo. E. Thackray*
ATTORNEY

UNITED STATES PATENT OFFICE.

HARRY R. GEER, OF JOHNSTOWN, PENNSYLVANIA.

ROLLING-MILL LUBRICATION.

1,397,163.     Specification of Letters Patent.     Patented Nov. 15, 1921.

Original application filed February 14, 1920, Serial No. 358,783. Divided and this application filed October 7, 1920. Serial No. 415,304.

*To all whom it may concern:*

Be it known that I, HARRY R. GEER, a citizen of the United States, and a resident of the city of Johnstown, county of Cambria, and State of Pennsylvania, have invented certain new and useful Improvements in Rolling-Mill Lubrication; and I do hereby declare the following to be a full, clear, and exact description of the invention, such as will enable others skilled in the art to which it appertains to make and use the same.

My invention relates to improvements in the shaft lubrication of the class or type of rolling mill known in the art as a universal rolling mill, and is designed to provide an improved arrangement therefor, and is a division of my application for U. S. Patent on rolling mill filed February 14, 1920, Serial Number 358,783.

My invention provides a separate shaft at the upper end of each vertical roll, which shafts are placed at different levels and carry sliding bevel gears that mesh with overlapping bevel gears on the rolls, thus enabling the rolls to be brought nearer each other to form desired passes of any width. The sliding bevel gears which are adapted to rotate with the shafts are mounted in bearings carried by the roll housings and in moving along the shafts actuate automatic lubricating devices contained therein, thus insuring a minimum of friction and wear. Side and central journal end bearings are provided for the shafts, on the outer ends of which are mounted outboard or overhung spur gears engaging spur gears on the main driving shaft.

A split collar is provided which fits an annular groove on the shaft of each roll and bears against the inside face of the side journal bearing, thereby acting as a thrust ring to restrain longitudinal motion of the shaft. Upon removal of this split collar the shaft can be withdrawn through the side journal bearing, thereby simplifying the removal of the rolls.

Having thus given a general description of my invention, I will now, in order to make the matter more clear, refer to the annexed sheet of drawings which forms part of this specification and in which like characters refer to like parts.

Figure 1 is a vertical longitudinal sectional elevation of the shaft mechanism for driving the vertical rolls of a universal rolling mill.

Fig. 2 is a vertical longitudinal section of one of the shafts drawn to a larger scale.

Fig. 3 is a transverse section taken on the line III—III of Fig. 2.

Fig. 4 is a detail view in vertical section of one of the valves controlling the supply of lubricant to the outside of one of the shafts.

Fig. 5 is a vertical transverse sectional elevation taken on the line V—V of Fig. 2.

Referring now to the characters of reference on the drawings:—1 represents a part of a rolling mill housing which has the vertical roll housings 2 which carry the vertical rolls 3. The vertical rolls 3 carry at their upper ends the bevel gears 4 which mesh with the bevel gears 5 mounted in the bearings 8 on the vertical roll housings 2. The bevel gears 5 are adapted to rotate with and slide longitudinally back and forth on the shafts 6, as the distance between the rolls is varied. The shafts 6 are carried in the side journal bearings 7 and the central end journal bearings 9. Each shaft 6 carries on its outer end the outboard or overhung spur gears 10 which engage corresponding gears on the main drive shaft which has, in the preferred embodiment of my invention, an independent driving means.

The split collars 11 are mounted in the annular grooves 12 of the shafts 6 and are secured thereto by the bolts 13. The split collars 11 act as thrust rings against the inner face of the side journal bearings 7 and thus prevent longitudinal motion on the shafts 6. Removal of the split collars 11 allows the shafts 6 to be withdrawn from the bevel gears 5 and through the side journal bearings 7. The vertical rolls 3 may then be released from their housings 2 and readily removed from the mill.

Each of the shafts 6 contains a longitudinal lubricant duct 14 fed through an outside sealed connecting pipe 15 connecting with a lubricant reservoir, not shown, adapted to supply lubricant as needed. Leading from the longitudinal duct 14, at intervals, are the branch ducts 16 which supply lubricant to the shafts 6. The feeding of the lubricant is automatic as the ball valves 20 are opened when the bevel gears 5 slide over and depress them against the valve springs 19.

The ball valves 20 and the valve springs 19 are contained in the valve casings 17 which have the valve seats 21 and contain the washers 18. The valve casings 17 have holes 22 in their tops whereby, with a spanner wrench, they can be screwed into or out of the enlarged and tapped mouths of the branch ducts 16.

Although I have shown and described my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a universal mill, provided with driving shafts geared to the vertical rolls by a sliding gear splined on each driving shaft and meshing with a gear on one end of the vertical rolls, means adapted to rotate the driving shafts, a longitudinal lubricant duct in each driving shaft and transverse lubricant ducts therein connecting with the longitudinal lubricant duct and terminated by ball valves adapted to be actuated by said sliding gear as it reciprocates on its driving shaft, and means for supplying lubricant to said longitudinal duct.

2. In a universal mill, provided with driving shafts for the vertical rolls, a gear mounted on one end of each vertical roll, a sliding gear splined on each driving shaft and adapted to mesh with the gear on the corresponding vertical roll, means for rotating the driving shafts, a longitudinal duct in each driving shaft, a means for supplying lubricant to said longitudinal duct, a plurality of transverse ducts in each driving shaft leading from the longitudinal duct to the surface of the driving shaft, and ball valves mounted in the outer ends of said transverse ducts and adapted to be operated by the sliding gear as it reciprocates on its respective driving shaft.

In witness whereof I hereunto affix my signature.

HARRY R. GEER.